United States Patent [19]

Hughes et al.

[11] 4,305,145
[45] Dec. 8, 1981

[54] SPINDLE RETRACTING MECHANISM FOR DISC RECORD PLAYER

[75] Inventors: Larry M. Hughes; Kenneth L. George, both of Indianapolis, Ind.

[73] Assignee: RCA Corporation, New York, N.Y.

[21] Appl. No.: 148,305

[22] Filed: May 9, 1980

[51] Int. Cl.³ .............................................. G11B 17/04
[52] U.S. Cl. ...................................... 369/77; 369/270
[58] Field of Search ................. 369/77, 219, 225, 262, 369/264, 268, 270; 360/97, 133

[56] References Cited

U.S. PATENT DOCUMENTS

| | | | | |
|---|---|---|---|---|
| 2,525,926 | 10/1950 | Matthews | | 369/77 |
| 2,670,210 | 2/1954 | Thompson | | 369/77 |
| 2,866,647 | 12/1958 | Somers | | 369/77 |
| 2,943,861 | 7/1960 | Redfield | | 369/77 |
| 3,241,840 | 3/1966 | Freier | | 369/270 |
| 3,867,724 | 2/1975 | Bruer et al. | | 369/270 |
| 4,109,919 | 8/1978 | Elliott et al. | | 369/77 |
| 4,226,424 | 10/1980 | Gordon | | 360/133 |

*Primary Examiner*—John W. Shepperd
*Attorney, Agent, or Firm*—E. M. Whitacre; J. S. Tripoli; D. A. Kulkarni

[57] ABSTRACT

In a video disc player, the turntable spindle is held in a raised position such that it is maintained in engagement with the record center hole when the turntable is lowered to transfer a spinning record from the turntable to the receiver pads. A mechanism, responsive to the insertion of an empty jacket into the player, retracts the spindle to allow the insertion of the jacket into the player free from interference with the spindle.

12 Claims, 8 Drawing Figures

SPINDLE RETRACTING MECHANISM FOR DISC RECORD PLAYER

This invention relates to disc record players, and more particularly, to players wherein a disc record is transferred between a record receiving means and a turntable.

In certain systems, video information is stored on a disc record in the form of geometric variations in a continuous spiral track disposed on the record surface. The variations in capacitance between an electrode carried by a record-engaging stylus and a conductive property of the record are sensed to reproduce the stored information. A capacitance-type video disc system is illustratively disclosed in U.S. Pat. No. 3,842,192 (Clemens).

To protect the video disc record, it is beneficial to enclose it in a caddy which comprises an outer jacket and a record retaining spine. For record loading, a full caddy is inserted into an input slot provided in the player. A record extraction mechanism disposed in the player removes the record/spine assembly from the jacket for retention in the player during subsequent jacket withdrawal. The retained record/spine assembly is supported in the player on a set of receiving pads. To transfer the record to the turntable for playback, the turntable is raised relative to the receiving pads. The record player is provided with hold-down members which hold the retained spine in place while allowing the retained record to be picked up by the turntable when it is raised. During playback, the pickup stylus is traversed radially across the record while the turntable spins the record at the desired speed (e.g., 450 rpm). For record retrieval, the record is transferred back to the receiving pads by lowering the turntable with respect to the receiving pads to redefine the record/spine assembly. An empty jacket is then inserted into the player, whereby the record/spine assembly is returned back into the jacket. Withdrawal of the caddy from the player effects record retrieval. Reference is made to U.S. patent application, Ser. No. 964,531, entitled "VIDEO DISC PLAYER", and filed in the name of Torrington for an example of a video disc player of the type mentioned above.

In such systems, when the turntable is lowered to transfer the retained record to the receiving pads, the record, which is still rotating, has a tendency to get out of registration with the retained spine disposed on the receiving pads which, in turn, prevents proper record retrieval. In accordance with a system described in a concurrently-filed, commonly-assigned, copending patent application of Hughes et al, entitled "DISC PLAYER HAVING DISC STABILIZING APPARATUS", the record centering spindle is mounted for relative motion independent of the turntable along a path parallel to the axis of the turntable. The spindle is held in a raised position such that it is maintained in engagement with the center hole of the record when the turntable is lowered to transfer a spinning record from the turntable to the receiving pads, thereby keeping the record aligned with the spine as the record is received therein. The spindle is retracted in response to the caddy insertion in a manner permitting the caddy insertion free from interference with the spindle.

The present invention is directed to an improved spindle retracting mechanism. In accordance with the present invention, a pulldown ring is pivotally supported about an axis disposed substantially orthogonal to the turntable axis on a frame which is arranged underneath the turntable. The supporting frame is, in turn, subject to motion between a lifted position and a depressed position. An actuating member causes motion of the supporting frame, carrying the pulldown ring, to the depressed position when the cover is inserted into the player. A pair of yoke members, secured to the spindle and having end portions disposed beneath the pulldown ring for engagement with the oppositely-disposed segments thereof, retract the spindle upon insertion of the cover into the player.

A feature of the subject apparatus is that the retraction of the spindle is made independent of the position of the yoke members relative to the pulldown ring. A further feature of the subject apparatus is that the split yoke arrangement facilitates assembly operations.

Figure 1:
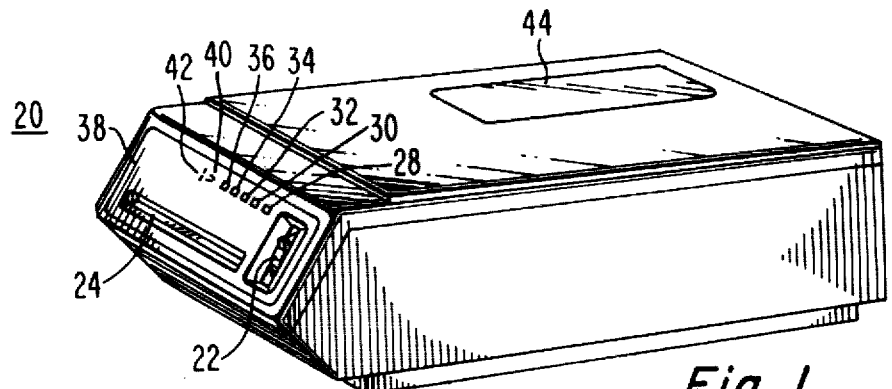
FIG. 1 shows the video disc player incorporating the spindle retracting apparatus according to the instant invention.
Figure 3:
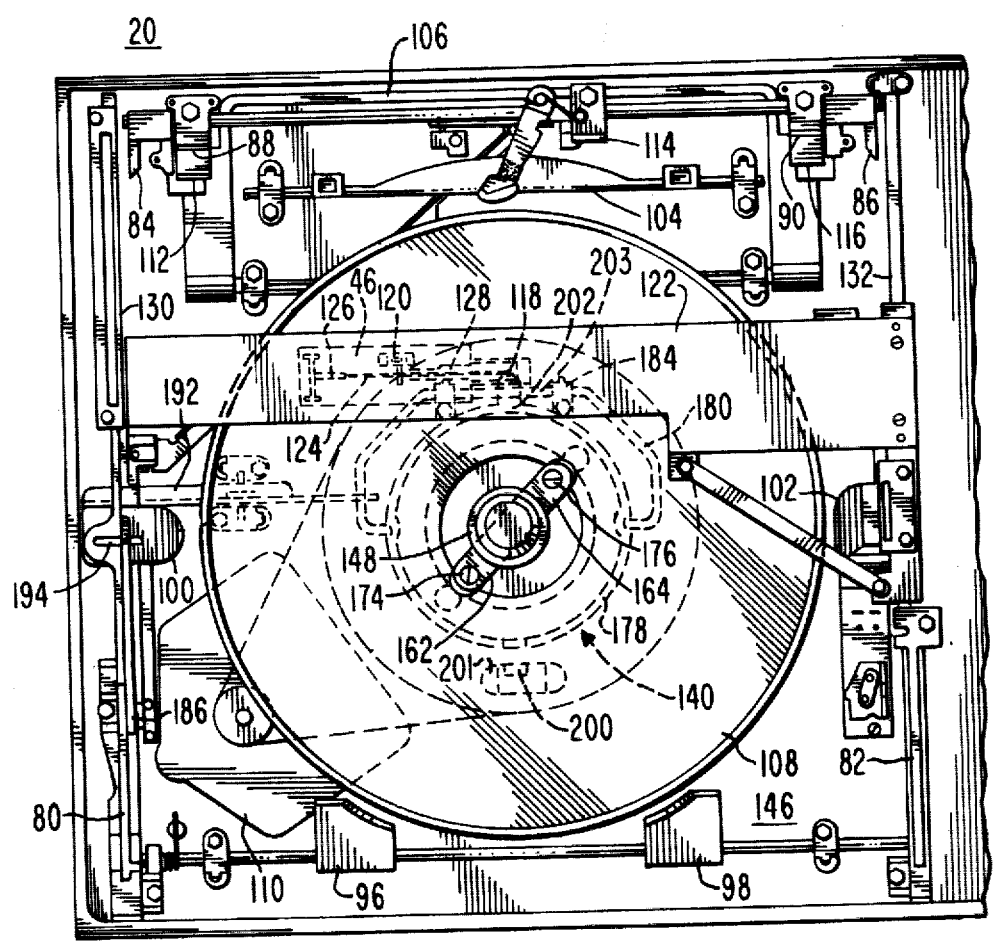
Figure 5:
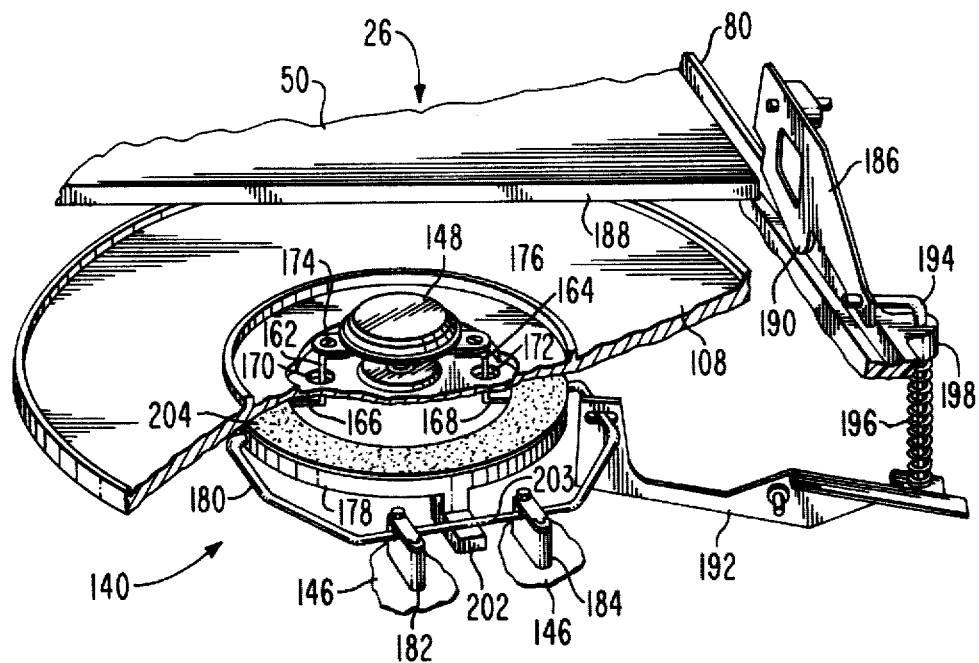
Figure 4:
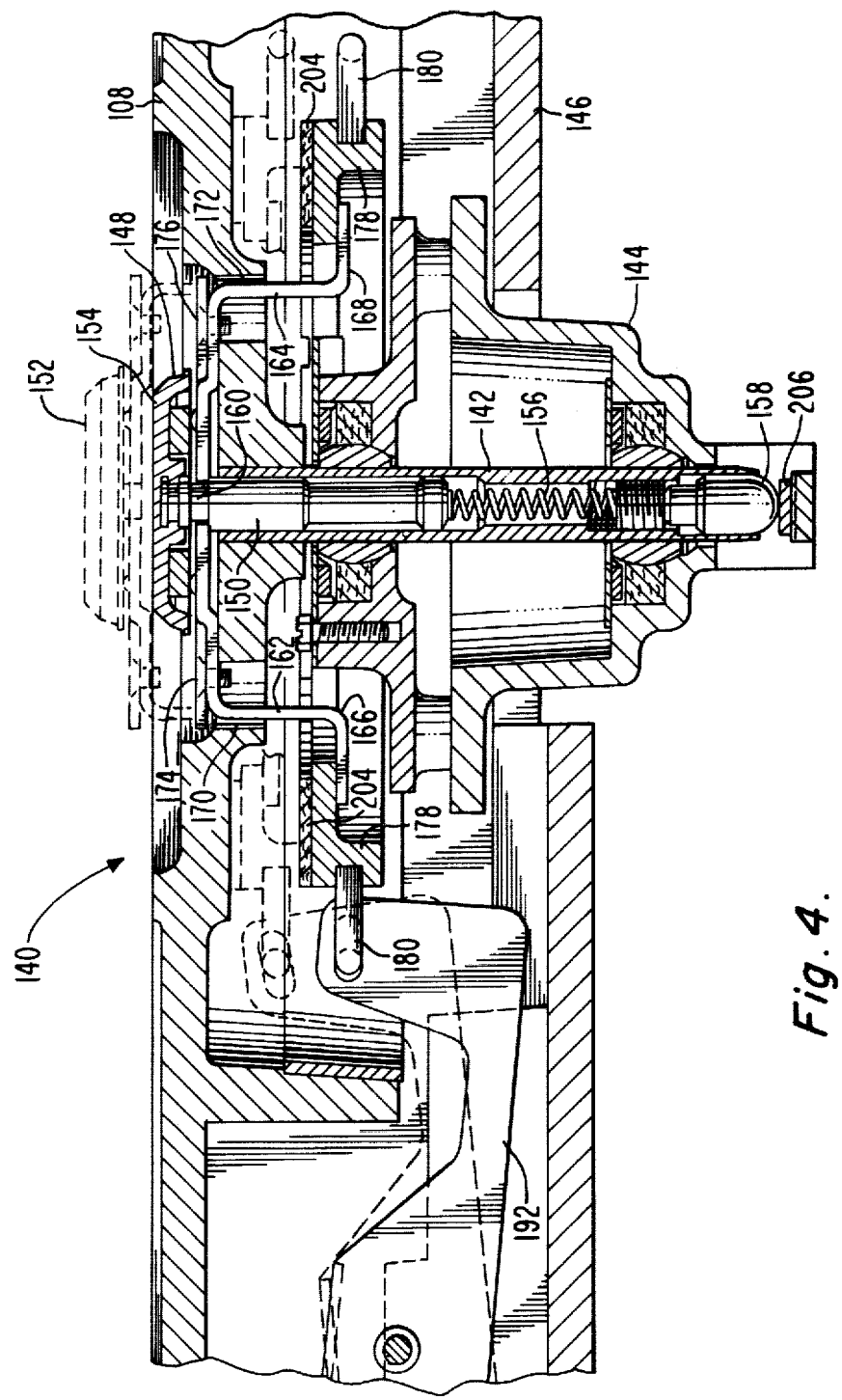
Figure 7:
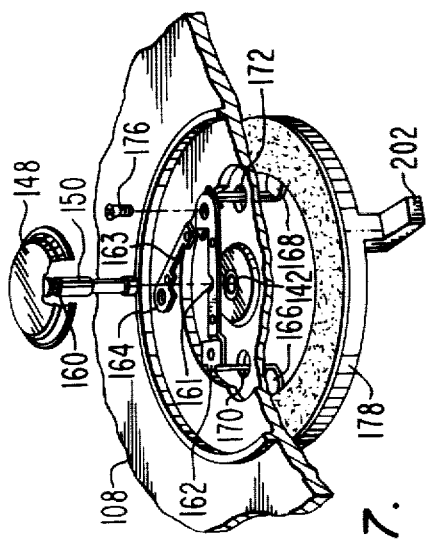
Figure 6:
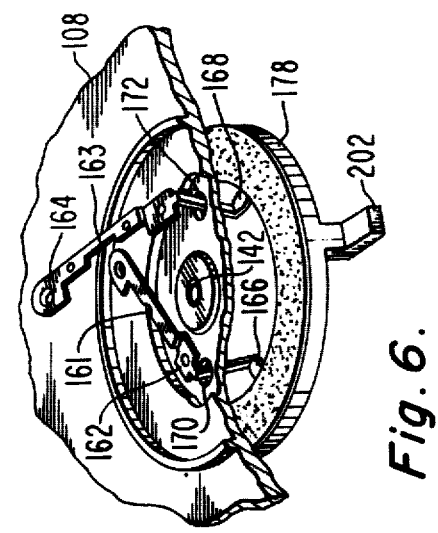
Figure 8:
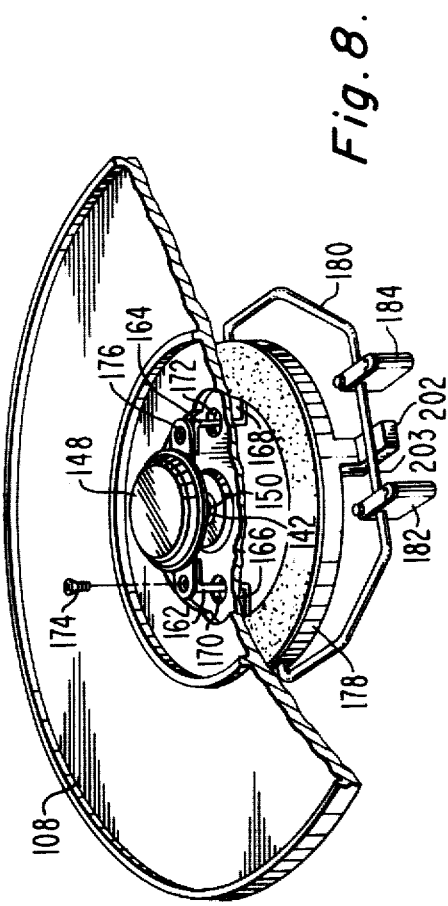

FIG. 3 provides a plan view of the video disc player showing the spindle retracting apparatus of FIG. 1;

FIG. 4 represents a sectional view of the spindle retracting apparatus of FIGS. 1 and 3;

FIG. 5 provides a perspective view of the spindle retracting apparatus of FIGS. 1, 3, and 4; and FIGS. 6, 7 and 8 illustrate the assembly operations involved in the construction of the spindle retracting apparatus of FIGS. 1, 3, 4 and 5.

Shown in FIG. 1 is a video disc player 20 having the subject spindle retracting apparatus. A function lever 22 is subject to disposition in any one of three positions - OFF, PLAY and LOAD/UNLOAD. A door flap closes a caddy input slot 24 when the function lever 22 is disposed in the OFF and PLAY positions. In the LOAD/UNLOAD position of the function lever 22, the door flap is opened to permit insertion of a caddy 26, shown in FIG. 2, into the player to load an enclosed record therein. A pushbutton 28 is provided to dispose the player in the "PAUSE" mode. A set of pushbuttons 30, 32, 34 and 36 are arranged on the instrument panel 38 to dispose the player in any one of four "SEARCH" modes, i.e., rapid access (forward/reverse) and visual search (forward/reverse). A digital readout 40 provides an indication of playing time and other functions, such as PAUSE, LOAD/UNLOAD and END-OF-PLAY, etc. A pair of tally lights 42 are operated to provide an indication of the record side subject to play, e.g., "SIDE 1" and "SIDE 2". An access door 44 is disposed on the cover of the player to provide access to a stylus cartridge 46 (FIG. 3).

Figure 2:
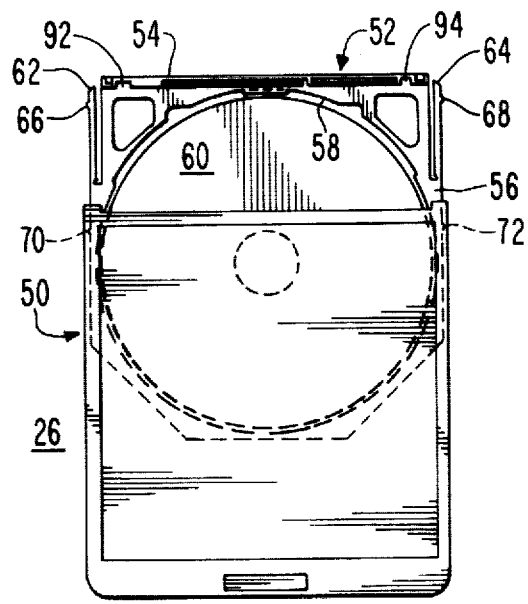
FIG. 2 illustrates a video disc caddy suitable for use with the spindle retracting apparatus of FIG. 1 in the practice of the subject invention.

As shown in FIG. 2, the video disc caddy 26, suitable for use with the present spindle retracting apparatus, comprises a jacket 50 having an edge opening and a substantially planar, record retaining spine 52. The spine 52 has a portion 54 which serves as a closure when the spine is fully inserted into the jacket, and a further portion 56 having a circular opening 58 for receiving a record 60. The spine 52 is further provided with integrally-molded, flexural latch fingers 62 and 64. Each of the spine latch fingers 62 and 64 has a protruding element 66 and 68. The protruding elements 66 and 68 are received in pockets 70 and 72 disposed in the jacket 50 for locking the spine 52 in place when it is fully inserted therein.

The operation of the caddy extraction mechanism will be first explained in conjunction with FIG. 3. To load a record into the player, a caddy is inserted into the input slot 24 along a path defined by guideways 80 and 82. As the caddy arrives at a fully inserted position in the player, latch defeat members 84 and 86 enter the jacket 50 to defeat the spine latch fingers 62 and 64 for freeing the spine 52 from the jacket. Pivotally mounted in the player are spine gripper members 88 and 90 which are received in respective cutouts 92 and 94, arranged in the spine 52, when the caddy arrives at the fully inserted position in the player in order to lock the spine to the player. Since the spine 52 is released from the jacket 50 through the operation of the latch defeat members 84 and 86 and is latched to the player through the operation of the spine gripper members 88 and 90, subsequent withdrawal of the jacket leaves the record/spine assembly in the player. The spring-loaded receiver pads 96, 98, 100, 102 and 104 serve to accurately locate the retained spine/record assembly in the player. A pair of springs (not shown) disposed between a gripper arm 106, which carries the spine gripper members 88 and 90, and the latch defeat members 84 and 86 effect downward deflection of the latch defeat members during jacket withdrawal.

To transfer the retained record to a turntable 108, the function lever 22 is moved to the PLAY position, which, in turn, raises the turntable and starts a turntable motor 110. A set of hold-down members 112, 114 and 116 hold the retained spine 52 in place against the receiver pads 96–104 while permitting the retained record to be picked up by the turntable 108 when it is raised. The hold-down members 112-116 also serve to accurately locate the retained spine 52, longitudinally and laterally, in the player. A pickup stylus 118 is gently lowered onto the information track disposed on the record by means of a stylus lifter 120 (for example, of the type described in U.S. Pat. No. 4,053,161) mounted in a carriage 122. The pickup stylus 118 is disposed at one end of a stylus arm 124. The other end of the stylus arm 124 is secured to the cartridge 46 by means of a rubber coupler 126. Disposed in the bottom wall of the carriage 122 is an opening 128 through which the stylus 118 is selectively lowered for record engagement. During playback, the carriage 122 is translated on guiderails 130 and 132 disposed parallel to the caddy guideways 80 and 82 from a starting position at the back of the player toward the front of the player in response to the radially inward motion of the pickup stylus 118 and in a direction disposed opposite to the direction of insertion of the caddy into the player. The recovered signals are processed to reconstruct a standard television signal containing picture and sound information for application to a television receiver.

To transfer the record back to the receiver pads 96–104 after playback, the function lever 22 is shifted back to the LOAD/UNLOAD position, which, in turn, lowers the turntable 108 to a level below the receiver pads. When the turntable 108 is lowered, the record, which is still spinning, is deposited on the receiver pads 96–104 for reception in the opening 58 disposed in the spine 52. The turntable motor 110 is shut off when the function lever 22 is displaced to the LOAD/UNLOAD position. To retrieve the record/spine assembly, the empty jacket 50 is inserted into the player through the input slot 24 along the guideways 80 and 82. As the jacket 50 arrives at the fully inserted position in the player, the front edge thereof engages the already deflected latch defeat members 84 and 86 to cause further downward deflection thereof. Such further downward deflection of the latch defeat members 84 and 86, in turn, effects downward displacement of the spine gripper members 88 and 90, whereby the spine 52 is freed from the player. When the jacket 50 is fully inserted into the player, the spine latch fingers 62 and 64 snap back into the pockets 70 and 72 to lock the spine 52 to the jacket. The record/spine assembly is withdrawn from the player when the caddy is extracted.

As previously indicated, when the turntable 108 is depressed to deposit the record onto the receiver pads 96–104, the record, which is still spinning, has a tendency to mislocate with respect to the opening 58 in the spine 52 disposed on the receiver pads, thereby preventing proper reception of the record in the spine. The subject spindle retracting apparatus 140, which overcomes the above-mentioned problems, will now be described in conjunction with FIGS. 4–8.

Referring to FIGS. 4 and 5, the turntable 108 is secured to a tubular shaft 142 which is journalled for rotation and translation in a bearing housing 144 fixedly mounted to the base plate 146 of the player. A record centering spindle 148 is disposed on a pin 150 which is received in the central opening of the turntable shaft 142. It will be seen that the spindle 148 is arranged coaxially with the turntable 108, and is subject to rotational and translational motion independent of the turntable. The raised position 152 and the depressed position 154 of the spindle 148 are respectively shown by the dotted lines and the solid lines in FIG. 4. A bias spring 156, arranged between the spindle pin 150 and a follower 158 disposed in the turntable shaft 142, urges the spindle 148 toward the raised position 152.

Disposed on the spindle pin 150 is a circumferential groove defining a neck portion 160 which is received in an aperture defined by cutouts 161 and 163 disposed in a pair of yokes 162 and 164 in the manner shown in FIGS. 6–8. The terminal portions 166 and 168 of the yokes 162 and 164 are threaded through opposing holes 170 and 172 in the turntable 108, and the yokes are secured to each other by means of screws 174 and 176 as illustrated in FIG. 5. The terminal portions 166 and 168 of the yokes 162 and 164 are received underneath a pulldown ring 178. The pulldown ring 178 is pivotally mounted on a C-shaped frame 180 which, in turn, is pivotally secured to the base plate 146 of the player by means of a pair of posts 182 and 184. The pivotal axes of the pulldown ring 178 and the supporting frame 180 are substantially perpendicular to the turntable axis.

As shown in FIGS. 3 and 5, an actuating cam 186 is pivotally mounted adjacent to the caddy guideway 80 such that the front edge 188 of the caddy 26 engages a portion 190 disposed on the cam 186 to raise the cam as the caddy is inserted into the player. A rocker arm 192, pivotally mounted to the base plate 146 of the player, has its one end connected to the C-shaped frame 180 and its other end secured to the actuating cam 186 by means of a connecting link 194. A return spring 196, arranged between a boss 198 fixedly disposed on the base plate 146 and the rocker arm 192, serves to bias the actuating cam such that it is normally disposed in the caddy insertion path. The return spring 196 also serves to bias the pulldown ring 178 toward the raised position. When the caddy 26 is inserted into the player, the actuating cam 186 is lifted out of the caddy insertion path. When the actuating cam 186 is lifted, the pulldown ring 178 is depressed and the spindle 148 is retracted.

The pulldown ring 178 is provided with a pair of extensions 200 and 202 which, in cooperation with stops 201 and 203 arranged on the base plate 146 of the player, serve to limit the upward motion of the pulldown ring. A felt ring 204 is affixed to the pulldown ring 178. The felt ring 204 engages the underside of the turntable 108 when the turntable is lowered to cause deceleration of the turntable. The location of the stops 201 and 203 is such that the felt ring 204, disposed on the pulldown ring 178, is spaced from the turntable 108 when the turntable is occupying the raised position to allow the rotation of the turntable free from interference by the pulldown ring.

The operation of the spindle pulldown apparatus 140 will now be explained with reference to FIGS. 1-8. When the record/spine assembly is loaded into the player, it rests on the receiver pads 96-104. The turntable 108 is raised by displacing the function lever 22 to the PLAY position to transfer the record to the turntable. The mechanism employed for raising and lowering the turntable 108 includes a slide mechanism 206 shown in FIG. 4. To initiate the playback sequence, the turntable motor 110 is started, the stylus 118 is lowered onto the record and the carriage 122 is driven to follow the stylus across the record. During playback, the turntable 108 spins the record at the desired speed (e.g., 450 rpm).

The function lever 22 is shifted back to the LOAD/UNLOAD position to lower the turntable 108 to a position below the level of the receiver pads 96-104 by means of the slide mechanism 206. As the turntable 108 is lowered, the record, which is still spinning, is deposited on the receiver pads 96-104. The bias spring 156 urges the spindle 148, which is mounted for motion independent of the turntable, to remain in the raised position 152 in engagement with the record center hole 208. Such record/spindle engagement ensures proper alignment and reception of the record in the opening 58 disposed in the spine 52 and formation of the record/spine assembly. The frictional engagement between the rotating record and the adjacent stationary surfaces decelerates the record. The felt ring 204 disposed on the pulldown ring 178 engages the underside of the turntable 108, as shown in FIG. 4, to bring the turntable to a halt.

To retrieve the record/spine assembly, the empty jacket 50 is inserted into the input slot 24 along the caddy guideways 80 and 82. The receiver pads 96-104 accurately align the record/spine assembly with respect to the caddy guideways 80 and 82 to facilitate return of the record/spine assembly into the jacket 50 as it is inserted into the player. As the jacket 50 is inserted into the player, the front edge 188 of the jacket 50 lifts the actuating cam 186 to, in turn, effect retraction of the spindle 148, whereby the jacket can be inserted into the player free from interference with the spindle. Withdrawal of the caddy 26 from the player after full insertion of the jacket therein effects retrieval of the record/spine assembly.

A feature of the subject spindle retracting apparatus is that the retraction of the spindle 148 is independent of the angular position of the spindle-mounted yokes 162 and 164 relative to the pulldown ring 178. This is because the pivotally-mounted, self-aligning pulldown ring 178 rotates until it engages both of the yokes 162 and 164 before it starts retracting the spindle 148.

Additionally, the split yoke configuration of the subject spindle retracting apparatus facilitates assembly operations in the manner indicated in FIGS. 6-8.

It will be noted that the yokes 162 and 164 are not tightly clamped to the spindle pin 150, but they ride loosely in the circumferential grooves disposed on the spindle pin. This allows the spindle 148 to rotate freely with respect to the turntable 108 and the yokes 162 and 164, thereby permitting the spindle 148 to match its rotational speed to that of the record. This is important during the period of record acceleration and deceleration, when there is a speed differential between the record and the turntable 108, in order to prevent wearing of the record center hole.

The present invention has been described in connection with a capacitive type video disc system. It will be understood that the invention described and claimed herein has equal applicability to any system wherein independent motion of a spindle relative to a turntable is desired.

What is claimed is:

1. In a record player for recovering prerecorded information from a disc record having a center hole; said record being subject to removable occupancy of a protective cover; said player including a turntable for rotatably supporting said record; said player having a spindle disposed coaxially with said turntable and subject to reception in said record center hole; said spindle being adapted for relative motion independent of said turntable along a path parallel to the axis of said turntable; an empty cover being inserted into said player along a path for retrieving a record retained in said player; apparatus comprising:
   (A) a pulldown member coupled to said spindle;
   (B) an element for pivotally supporting said pulldown member about an axis disposed substantially orthogonal to the axis of said turntable; said supporting element being subject to motion between an elevated position and a depressed position; and
   (C) means responsive to said cover insertion into said player for causing motion of said supporting element from said elevated position to said depressed position; said pulldown member being responsive to the motion of said supporting element to said depressed position for effecting retraction of said spindle out of said cover insertion path.

2. Apparatus as defined in claim 1 wherein said pulldown member comprises a ring disposed beneath said turntable such that said pivotal axis thereof intersects said turntable axis.

3. Apparatus as defined in claim 2 wherein said supporting element comprises a substantially C-shaped frame having said pulldown ring pivotally disposed between the terminal portions thereof; said apparatus including means for mounting said C-shaped frame about a further axis disposed substantially parallel to said pivotal axis of said pulldown ring for said motion thereof between said elevated position and said depressed position.

4. Apparatus as defined in claim 2 wherein said turntable is secured to a hollow shaft; wherein said spindle is mounted on a pin translatably received in said hollow shaft; said spindle pin having a circumferential groove defining a reduced portion; wherein said coupling between said pulldown member and said spindle is effected by a pair of yoke members; said yoke members being passed through a pair of opposing holes in said turntable for disposition beneath said pulldown ring;

each of said yoke members having a cutout; said cutouts defining an aperture for receiving said reduced portion of said spindle pin when said yoke members are secured to each other.

5. Apparatus as defined in claim 2 further including means for biasing said pulldown ring toward said lifted position thereof.

6. Apparatus as defined in claim 5 wherein said biasing means causes said pulldown ring to follow said turntable when said turntable is raised; said apparatus further including means for arresting upward motion of said pulldown ring when said pulldown ring arrives at said lifted position thereof; the location of said lifted position of said pulldown ring being such that said raised turntable is free to rotate without hindrance from said pulldown ring.

7. In a record player for recovering prerecorded information from a disc record having a center hole; said record being subject to removable occupancy of a protective cover; said player including a turntable for rotatably supporting said record; said player having a spindle disposed coaxially with said turntable and subject to reception in said record center hole for centering said record with respect to said turntable; said player further having means for mounting said spindle to said turntable for relative motion independent of said turntable along a path parallel to the axis of said turntable; said player further including a receiving means for supporting a record retained in said player; wherein said turntable is respectively lifted and lowered relative to said receiving means to transfer said retained record from said receiving means to said turntable for playback and from said turntable to said receiving means for retrieval; said player being equipped with means for holding said spindle in a raised location such that said spindle remains in engagement with said center hole of said retained record when said turntable is lowered for effecting transfer of said retained record to said receiving means; wherein an empty cover is inserted into said player along a further path for retrieving said retained record resting on said receiving means; said player additionally including means for retracting said spindle to a location out of said cover insertion path during insertion of said cover into said player to permit said cover insertion free from interference with said spindle; said spindle retracting means comprising:

(A) a pulldown member coupled to said spindle;
(B) an element pivotally supporting said pulldown member about an axis disposed substantially orthogonal to the axis of said turntable; said supporting element being subject to motion between an elevated position and a depressed position; and
(C) means responsive to said cover insertion into said player for causing motion of said supporting element from said elevated position to said depressed position; said pulldown member being responsive to the supporting element to said depressed position for effecting retraction of said spindle out of said cover insertion path.

8. Apparatus as defined in claim 7 wherein said pulldown member comprises a ring disposed underneath said turntable such that said pivotal axis thereof intersects said turntable axis.

9. Apparatus as defined in claim 8 wherein said supporting element comprises a substantially C-shaped frame having said pulldown ring pivotally disposed between the terminal portions thereof; said apparatus including means for mounting said C-shaped frame about a further axis disposed substantially parallel to said pivotal axis of said pulldown ring for said motion thereof between said elevated position and said depressed position.

10. Apparatus as defined in claim 8 wherein said turntable is secured to a hollow shaft; wherein said spindle is mounted on a pin translatably received in said hollow shaft; said spindle pin having a circumferential groove defining a reduced portion; wherein said coupling of said pulldown ring to said spindle is effected by a pair of yoke members; said yoke members being passed through a pair of opposing holes in said turntable for disposition beneath said pulldown ring; each of said yoke members having a cutout; said cutouts defining an aperture for receiving said reduced portion of said spindle pin when said yoke members are secured to each other.

11. Apparatus as defined in claim 8 further including means for biasing said pulldown ring toward said lifted position thereof.

12. Apparatus as defined in claim 11 wherein said biasing means causes said pulldown ring to follow said turntable when said turntable is raised; said apparatus further including means for arresting upward motion of said pulldown ring when said pulldown ring arrived at said lifted position thereof; the location of said lifted position of said pulldown ring being such that said raised turntable is free to rotate without hindrance from said pulldown ring.

* * * * *